(12) United States Patent (10) Patent No.: US 8,544,413 B1
Gnanendran (45) Date of Patent: Oct. 1, 2013

(54) ANIMAL WASTE BAG DISPENSER AND COLLECTION STATION

(75) Inventor: Abaragidan Gnanendran, Saint-Laurent (CA)

(73) Assignee: 9252-8595 Quebec Inc., Quebec (CA)

( * ) Notice: Subject to any disclaimer, the term of this patent is extended or adjusted under 35 U.S.C. 154(b) by 0 days.

(21) Appl. No.: 13/601,382

(22) Filed: Aug. 31, 2012

(51) Int. Cl.
*A01K 29/00* (2006.01)
*E01H 1/12* (2006.01)

(52) U.S. Cl.
USPC .............................. 119/161; 119/867; 294/1.4

(58) Field of Classification Search
USPC .................... 119/161, 867; 294/1.3, 1.4, 1.5; 15/104.8
See application file for complete search history.

(56) References Cited

U.S. PATENT DOCUMENTS

| | | | |
|---|---|---|---|
| 4,717,186 A * | 1/1988 | Yoshioka | 294/1.5 |
| 4,955,505 A * | 9/1990 | Battaglia | 220/495.07 |
| 5,167,377 A * | 12/1992 | Chalmers | 225/46 |
| 5,344,200 A * | 9/1994 | Yoshioka | 294/1.5 |
| 6,152,079 A * | 11/2000 | Chandler | 119/161 |
| 6,170,692 B1 | 1/2001 | Johnston | |
| 6,446,903 B1 | 9/2002 | Bazan | |
| 6,578,730 B2 * | 6/2003 | Trunsky | 221/34 |
| 7,077,443 B1 * | 7/2006 | Jones | 294/1.4 |
| 7,325,849 B2 * | 2/2008 | Jones | 294/1.4 |
| 7,523,972 B1 * | 4/2009 | Wawrzynowski | 294/1.3 |
| 2003/0029881 A1 | 2/2003 | Trunsky | |
| 2004/0090073 A1 * | 5/2004 | Edwards et al. | 294/1.3 |
| 2009/0151645 A1 | 6/2009 | Fangsrud | |

* cited by examiner

*Primary Examiner* — Yvonne Abbott

(74) *Attorney, Agent, or Firm* — Brinks Hofer Gilson & Lione

(57) ABSTRACT

An animal waste bag dispenser and collection apparatus may include an upright pole member, a dispenser housing and a receptacle. The dispenser housing may include a spindle, a mounting member, and a cover. The receptacle may include a receiving bin covered by a lid. The receiving bin may have a grooved sidewall configured to receive and mount the upright pole therein. The lid may removably cover the receiving bin, have a slotted wall configured to receive the upright pole therein, and have an opening configured to receive bags containing animal waste.

20 Claims, 22 Drawing Sheets

US 8,544,413 B1

ANIMAL WASTE BAG DISPENSER AND COLLECTION STATION

FIELD

The field of the invention generally relates to containers; in particular, the present embodiments relate to animal waste bag dispensing and collection.

BACKGROUND

Pet owners may bring pets to outdoor areas, including parks and other recreational areas, and designated indoor areas for pets. Bags and waste bins may be provided in these areas to encourage pet owners to keep the areas clean from pet waste. It may be desirable to provide the bags in dispensers that are in proximity to the waste bins, so as to allow pet owners to conveniently get bags and dispose of waste at or around the same location. Also, the dispensers and waste bins are exposed to weather conditions, such as rain, wind, and snow. Therefore, it is important that dispensers and waste bins have durable construction and configurations that will withstand various weather conditions.

In high traffic areas, the bags may be consumed quickly and the waste bins may be filled quickly. This may require frequent refilling of dispensers and emptying of the waste bins. Therefore, the dispensers should be configured to be conveniently refilled, and the waste bins should be configured to be easily emptied.

BRIEF SUMMARY

The disclosed aspects of the embodiments herein relate to an animal waste container configuration that provides convenience to users and installers, and is uniquely structured to withstand harsh weather conditions. Furthermore, the relatively narrow structure of the configuration allows for installation in a variety of space-restricted locations.

In one aspect, an animal waste bag dispenser and collection apparatus may include an upright pole, a dispenser housing that is detachably mounted to the upright pole by a mounting member, and a receptacle that is detachably mounted to the upright pole. The dispenser housing may include a spindle configured to receive a roll of bags and a cover having a front wall that has at least one pick opening configured to allow dispensing of the bags. The cover may be engagingly mounted on the mounting member to define a receiving space that encloses the spindle and the roll of bags. A receptacle may be detachably mounted to the upright pole and may include a receiving bin that has a grooved sidewall configured to receive and mount at least a portion of the upright pole therein. A lid may removably cover the receiving bin. The lid may have a slotted wall configured to receive at least a portion of the upright pole therein. The lid may also have an opening configured to receive bags containing animal waste.

In another aspect, an animal waste bag dispenser and collection apparatus may include a mounting surface and the dispenser housing. The dispenser housing may be detachably mounted to the mounting surface by a mounting member. The dispenser housing may have a first spindle to receive a first roll of bags and a second spindle to receive a second roll of bags. The dispenser housing may also have a cover that has a front wall that has at least one pick opening configured to dispense bags, and the cover may be engagingly mounted on the mounting member to define a receiving space that encloses the first and second rolls of bags. The apparatus may further include a receptacle that is detachably mounted to the mounting surface, and the receptacle may include a receiving bin that is mounted to the mounting surface. A lid may removably cover the receiving bin, and the lid may include an opening configured to receive bags containing animal waste.

BRIEF DESCRIPTION OF THE DRAWINGS

The embodiments herein may be better understood with reference to the following drawings and description. Non-limiting and non-exhaustive embodiments are described with reference to the following drawings. The components in the drawings are not necessarily to scale, emphasis instead being placed upon illustrating the principles of the invention. In the drawings, like referenced numerals designate corresponding parts throughout the different views.

DETAILED DESCRIPTION

Figure 1:
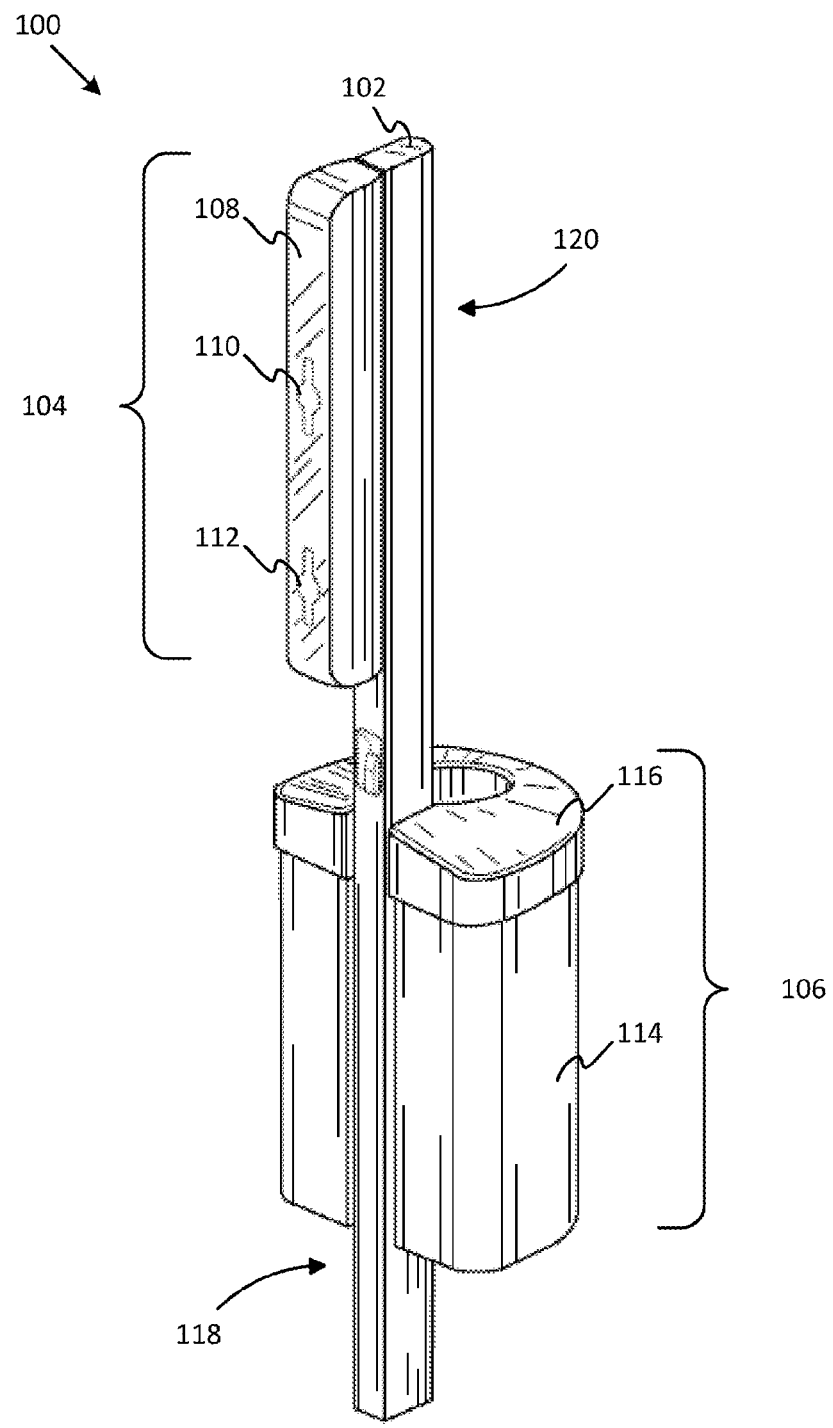
FIG. 1 is a perspective view showing an animal waste bag dispenser and collection station according to one embodiment.

FIGS. 1 to 6 show an exemplary embodiment of an animal waste bag dispenser and collection station. The animal waste bag dispenser and collection station 100 may include an upright pole 102, a dispenser housing 104, and a receptacle 106. The dispenser housing 104 may include a cover 108 and a mounting member. The dispenser housing 104 may have a width that is similar to the width of the pole. The mounting member may be detachably mounted to the upright pole 102. The cover 108 may include multiple pick points, or openings, 110, 112 for dispensing bags that may be contained in the dispenser housing 104. The receptacle 106 may include a receiving bin 114 covered by a lid 116. The lid 116 may removably cover the receiving bin 114, or may be hinged to be movable between an open and a closed position.

The upright pole 102 may be a length of aluminum with a uniform cross section along the length of the pole. The length of the upright pole 102 may be configured such that the dispenser housing is mounted at a convenient height for a man or woman of average height. For example, the pick points, or pick openings, 110, 112 may be positioned at a convenient height for men and/or women who are 5'4" to 5'8" tall. Other suitable materials for the pole may include, for example, steel, sheetmetal, iron, plastic, wood, or any other suitable material. The dispenser housing 104, receiving bin 114, and lid 116 may be made from aluminum, plastic, steel, sheetmetal, or any other suitable material. Any of these materials can be used for all or part of any of the dispenser housing 104, receiving bin 114, and lid 116. Suitable materials may be durable, resistant to weather and/or pet excrements, and/or aesthetically appealing. Various materials may be used depending on various factors, including, for example, cost, aesthetics, ease of manufacturing, rate of replacement, durability, and environmental conditions.

An animal waste bag dispenser and collecting station as described herein may be configured with any color combination or may be configured with graphics, indicia, characters, and/or images. For example, on a college or university campus the dispenser and collecting station may be configured with school colors. As another example, a dispenser and collecting station near a children's playground may be configured to include bright colors, cartoon characters, or other indicia, which may encourage children to properly dispose of animal waste. At parks and recreational areas, the dispenser and collecting station may be configured in shades of green, blue, sand, or other colors found in nature, so as to allow the dispenser and collecting station to blend in with the environment. Alternatively, the dispenser and collecting station may be configured with bright colors so that it can be easily seen and found.

The dispenser housing 104 and the receptacle 106 may be mounted at any location along the upright pole 102. For example, the receptacle 106 may be mounted to a base portion 118 of the upright pole 102, and the dispenser housing 104 may be mounted to the upper portion 120 of the upright pole. Alternatively, the dispenser housing 104 may be mounted to the base portion 118 of the upright pole 102, and the receptacle 106 may be mounted to the upper portion 120 of the upright pole 102. As another alternative, the dispenser housing 104 may be mounted on the upright pole 102 so that the bottom of the dispenser housing is at a lower height than the top of the receptacle 106. The dispenser housing 104 and the receptacle 106 may be mounted on opposite sides of the upright pole 102. Alternatively, the dispenser housing 104 and the receptacle 106 may be mounted on the same side of the upright pole 102. In other embodiments, the dispenser housing 104 and/or the receptacle may be mounted, independently or together, on a pole, a wall, a fence, or other surface.

Figure 2:
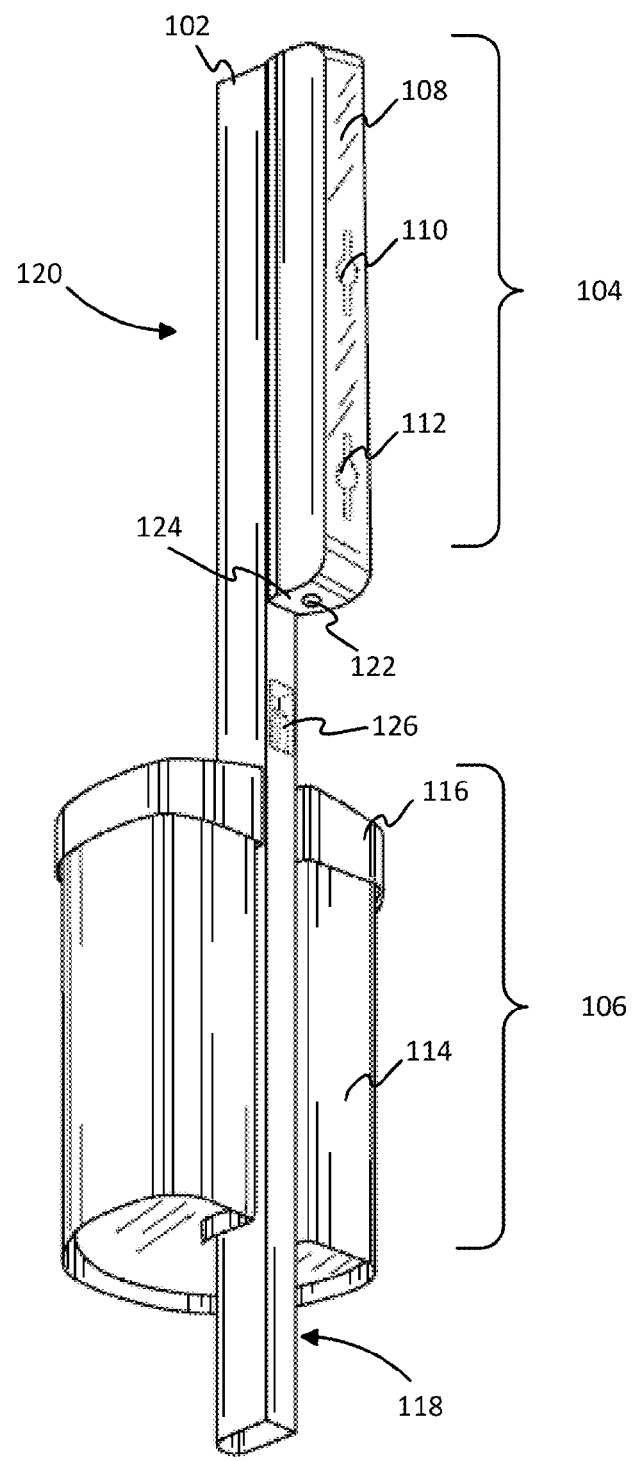
FIG. 2 is another perspective view.
Figure 3:
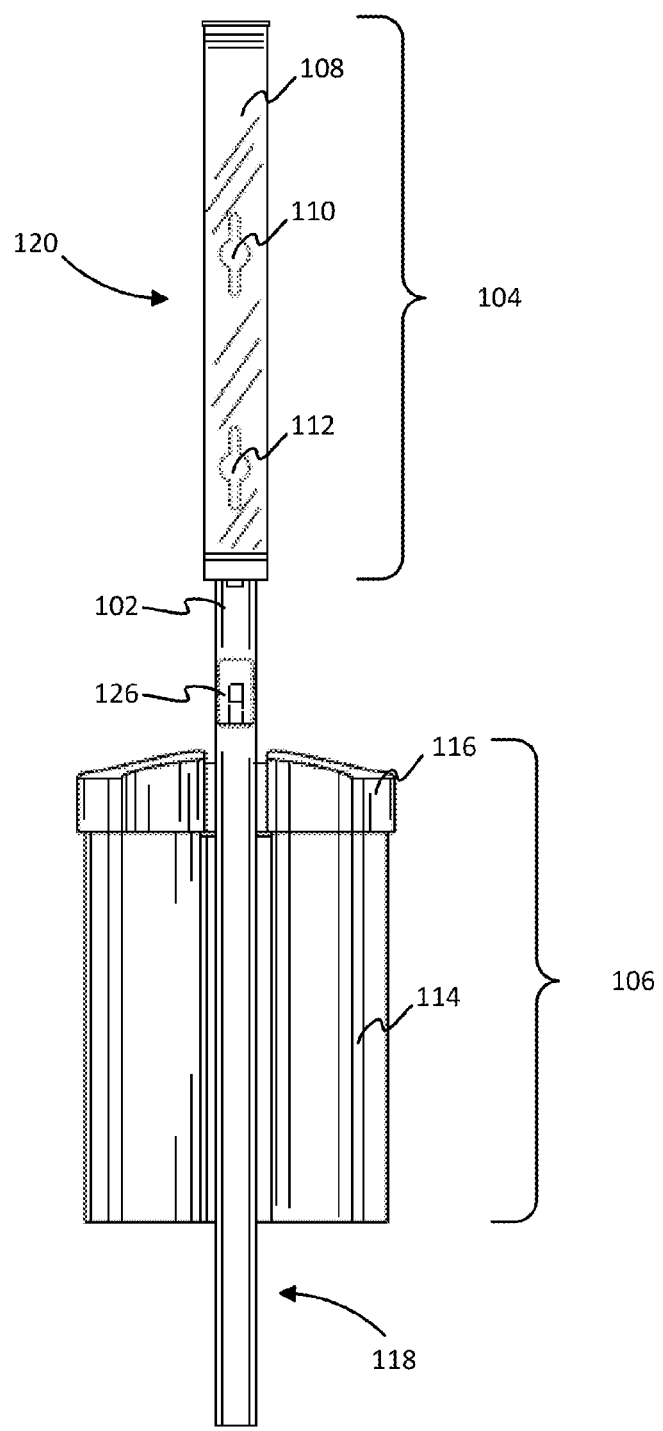
FIG. 3 is a rear view.
Figure 4:
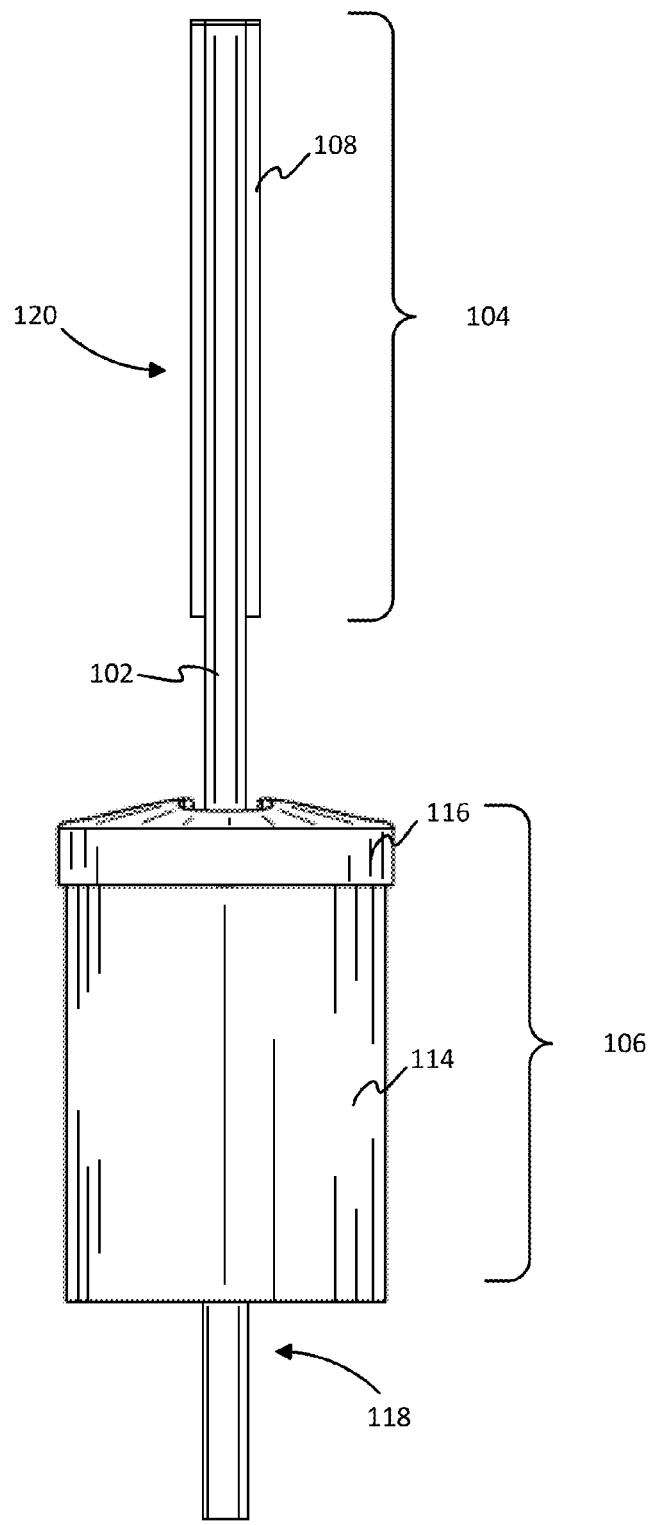
FIG. 4 is a front view.
Figure 5:
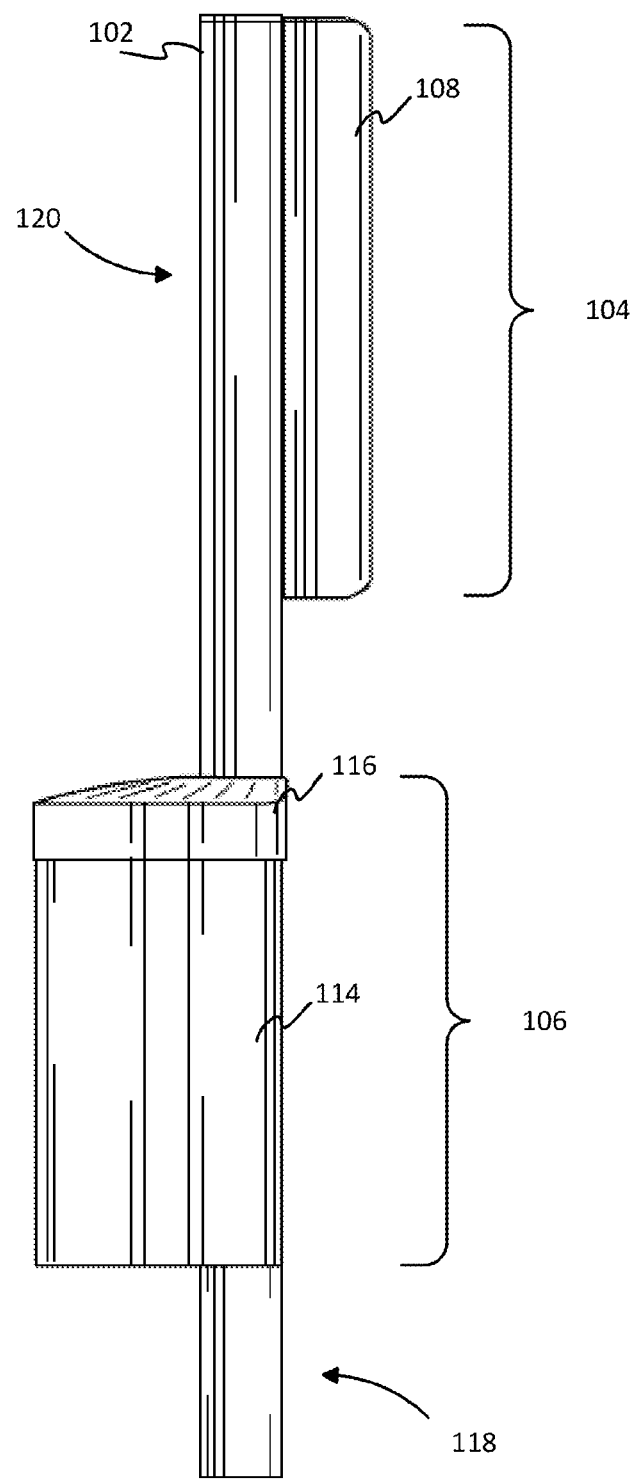
FIG. 5 is a side view.
Figure 6:
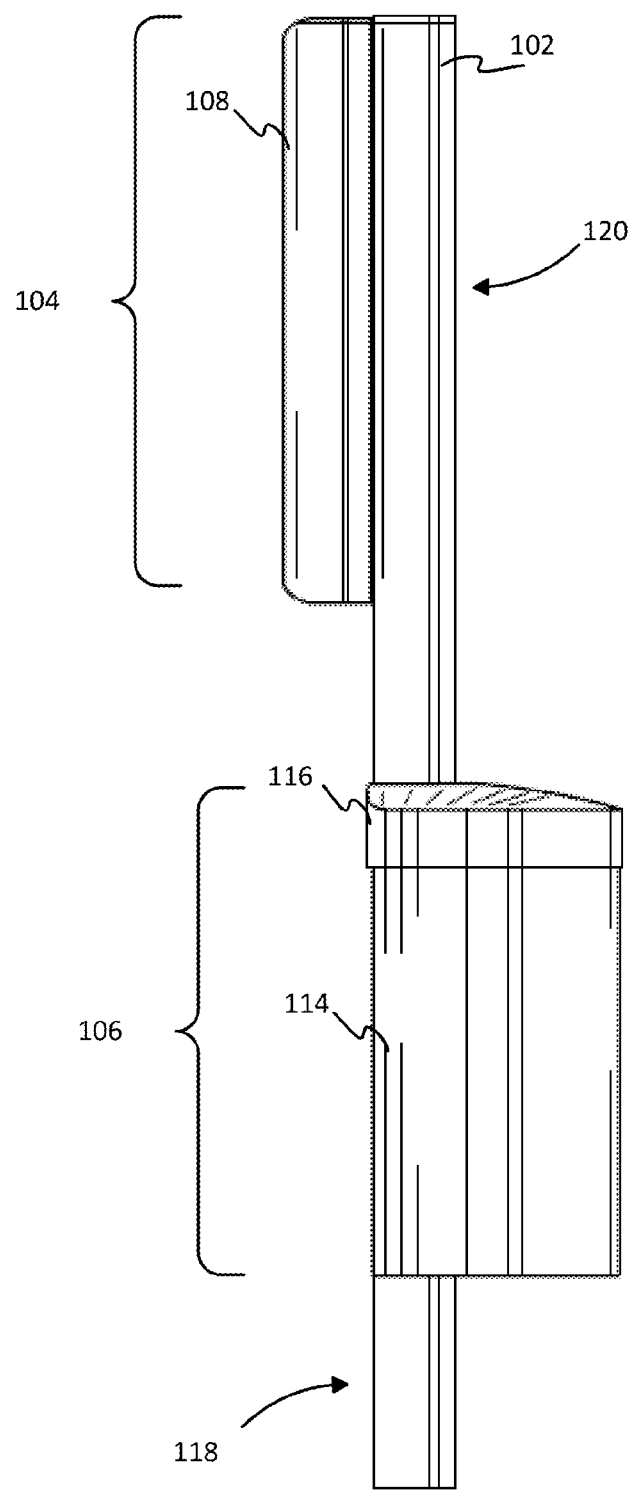
FIG. 6 is a another side view.

The animal waste bag dispenser and collection station 100 may further include a lock for securing the cover 108 to the mounting member. For example, the cover 108 may have a keyhole 122, as shown in FIG. 2, in the bottom wall 124 of the cover 108 for accessing the lock. Alternatively, the keyhole 122 may be positioned at any accessible location on the cover 108.

The upright pole 102 may be hollow to allow the upright pole 102 to be conveniently slid onto a post 126. The post 126 may be a stake that is driven into the ground, or may be inserted into a cement base, such as a sidewalk or a cement block. Alternatively, the upright pole 102 may be a solid pole, or the upright pole 102 may be an extruded metal, such as extruded aluminum, steel or other weather resistant metal, having any cross section.

Figure 7:
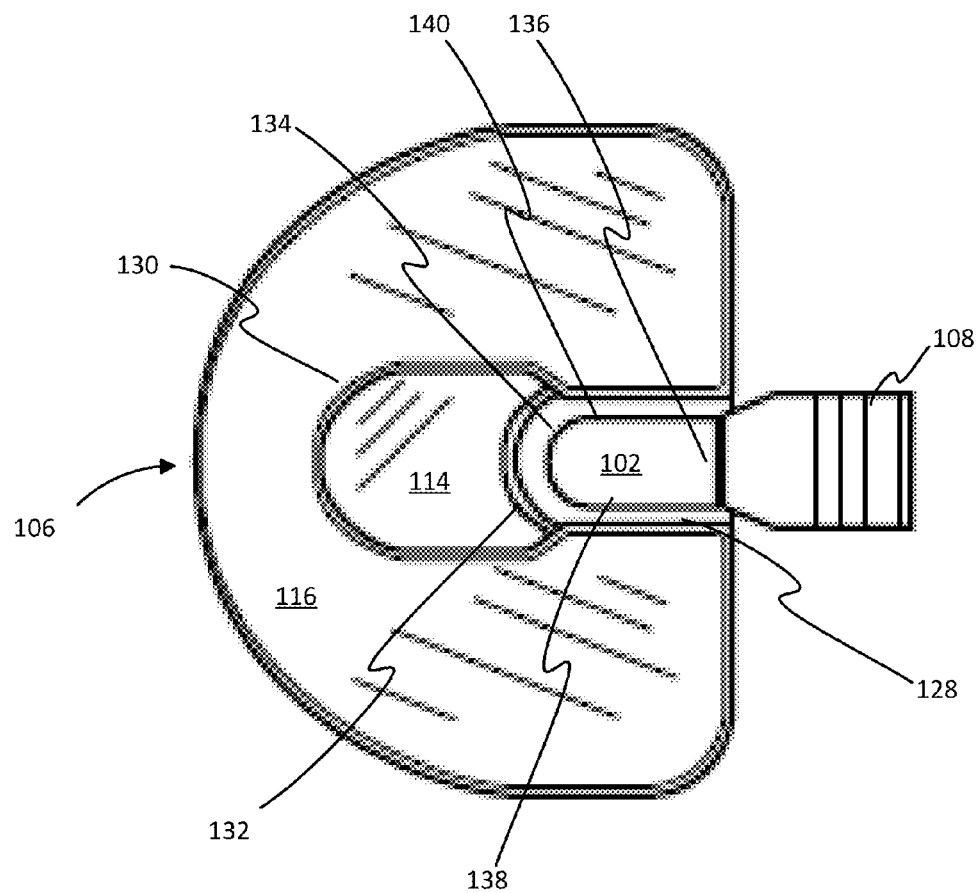
FIG. 7 is a top view.
Figure 8:
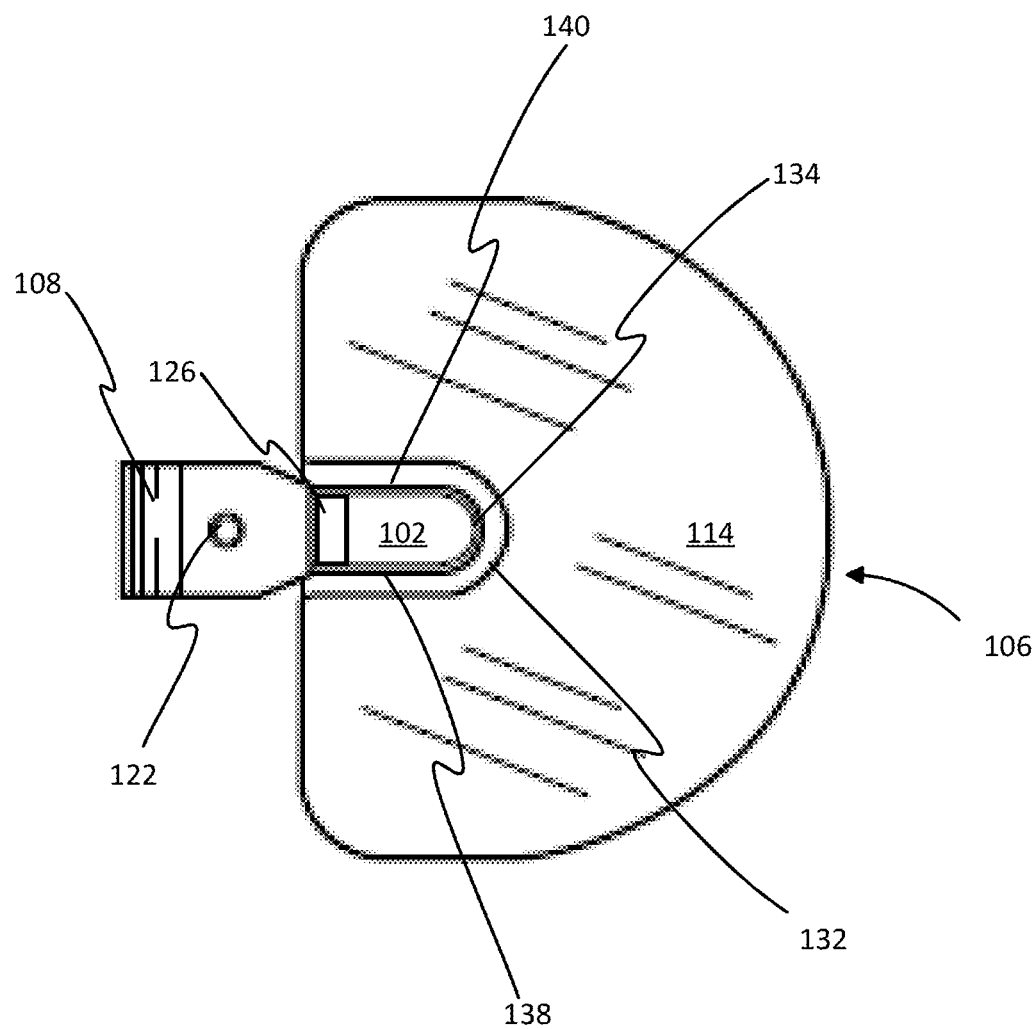
FIG. 8 is a bottom view of the animal waste bag dispenser and collection station according to one embodiment.

FIGS. 7 and 8 show a top and bottom view of an animal waste bag dispenser and collection station according to another embodiment. The receiving bin 114 may include a groove, or elongated recess, 132 that fits around the upright pole 102. The groove, or elongated recess, 132 may allow the receiving bin to be mounted securely onto the upright pole 102. As shown in FIG. 7, the upright pole may have a generally oblong shape with a curved sidewall 134, a planar sidewall opposite the curved sidewall 136, and two planar sidewalls 138, 140 adjoining the curved sidewall 134 and the planar sidewall opposite the curved sidewall 134. The lid 116 may include a slot 128 that fits around the upright pole 102. The lid 116 may also include an opening 130 for disposing bags that contain animal waste. The opening 130 may be sized to allow the bags containing animal waste to fall through the lid 116 and into the receiving bin 114. The lid 116 may be secured to the receiving bin 114 by clips, and is removable from the receiving bin 114 to allow emptying of the receiving bin 114. Alternatively, the lid 116 may be coupled to the receiving bin 114 by a hinge, so that the lid 116 is movable between a close position and an open position. In the closed position, the lid 116 may prevent rain and foreign debris from falling into the receiving bin 114, while still allowing bags that contain animal waste to be disposed in the receptacle 106. In the open position, the lid 116 allows contents to be emptied from the receiving bin 114.

Figure 9:
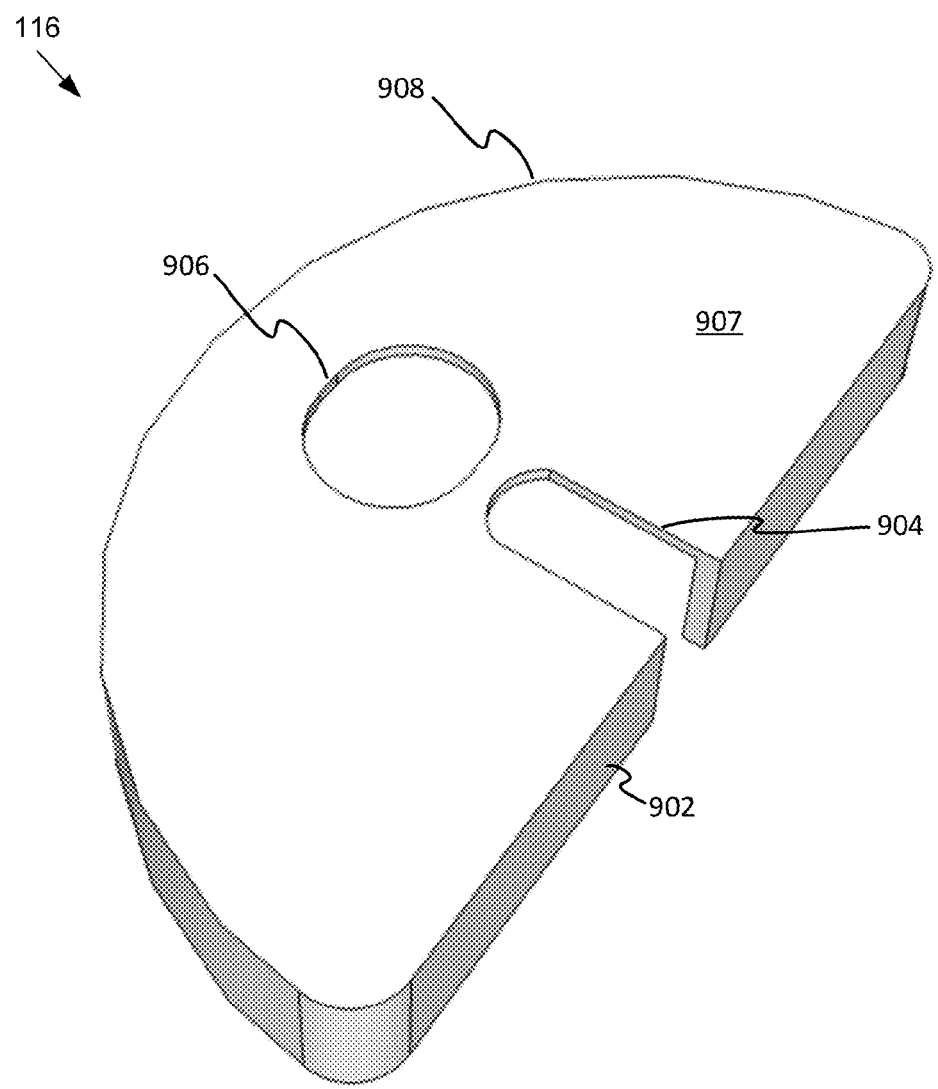
FIG. 9 shows a more detailed view of an exemplary embodiment of a lid of a receiving bin of an animal waste bag dispenser and collection station.

FIG. 9 shows a more detailed view of an exemplary embodiment of a lid of a receiving bin of an animal waste bag dispenser and collection station. The lid 116 may have a slotted wall 902 with a slot 904 that is sized to receive the upright pole 102. The lid 116 also has an opening 906 in the top wall 907 that is sized for disposing bags containing animal waste into the receptacle 106. The slot 904 and the opening 906 may be separate. The lid 116 may be generally semicircular, with a curved sidewall 908 and the planar slotted wall 902 that fits complimentarily with the cross-section of the receiving bin 114. Alternatively, the lid 116 may be any shape, such as square, rectangular, or a non-symmetrical shape, that fits the upright pole 102.

Figure 10:
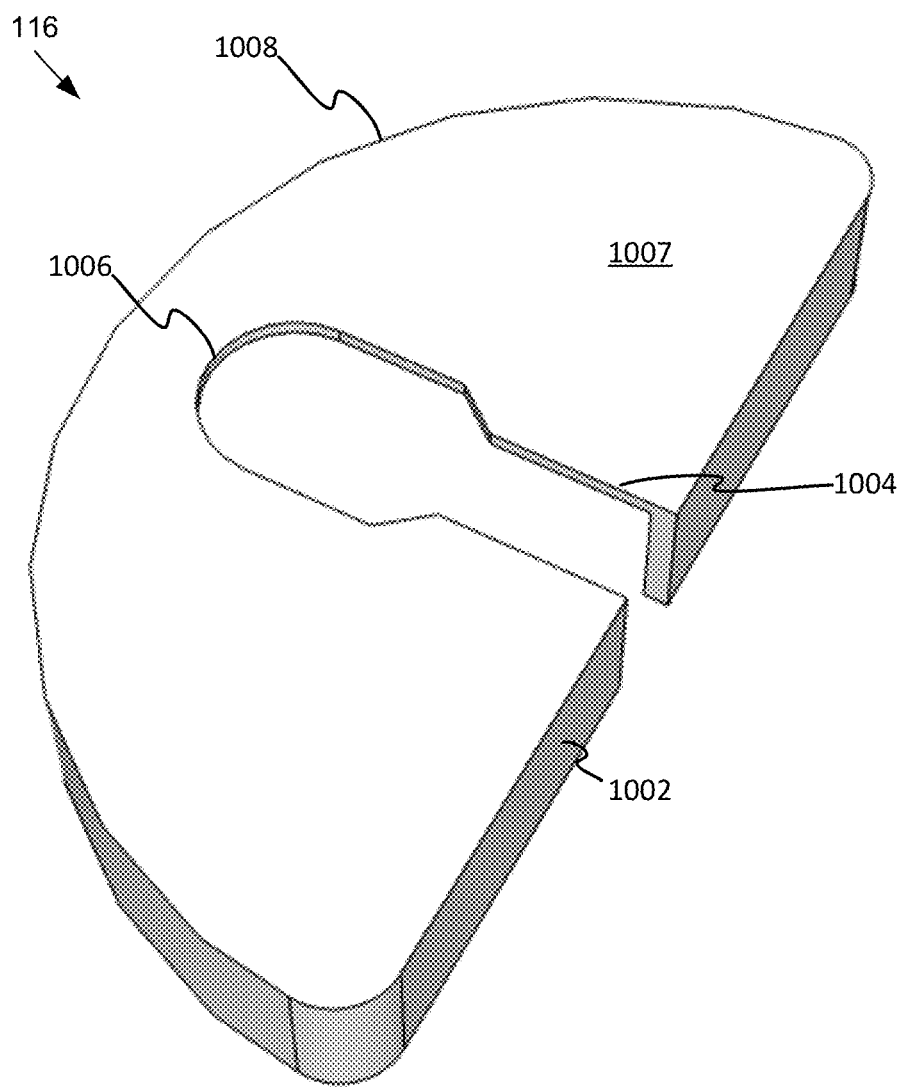
FIG. 10 is another embodiment of a lid of a receiving bin of an animal waste bag dispenser and collection station.

FIG. 10 is another embodiment of a lid of a receiving bin of an animal waste bag dispenser and collection station. The lid 116 may have a slotted wall 1002 and the slot 1004 and the opening 1006 in the top wall 1007 may form a continuous notch in the slotted wall 1002. The curved sidewall 1008 may include a handle for lifting the lid, or may include a lock for securing the lid to the receiving bin. The shape and size of the slot 1004 and opening 1006 are not limited to that which is shown in FIG. 10. Generally, the shape and size of the slot 1004 may vary depending on the geometry and of the upright pole 102. The shape and size of the opening 1006 may vary depending on the size of bags or waste to be disposed in the receptacle. For example, the slot and/or opening may be square, rectangular, circular or a non-symmetrical shape.

Figure 11:
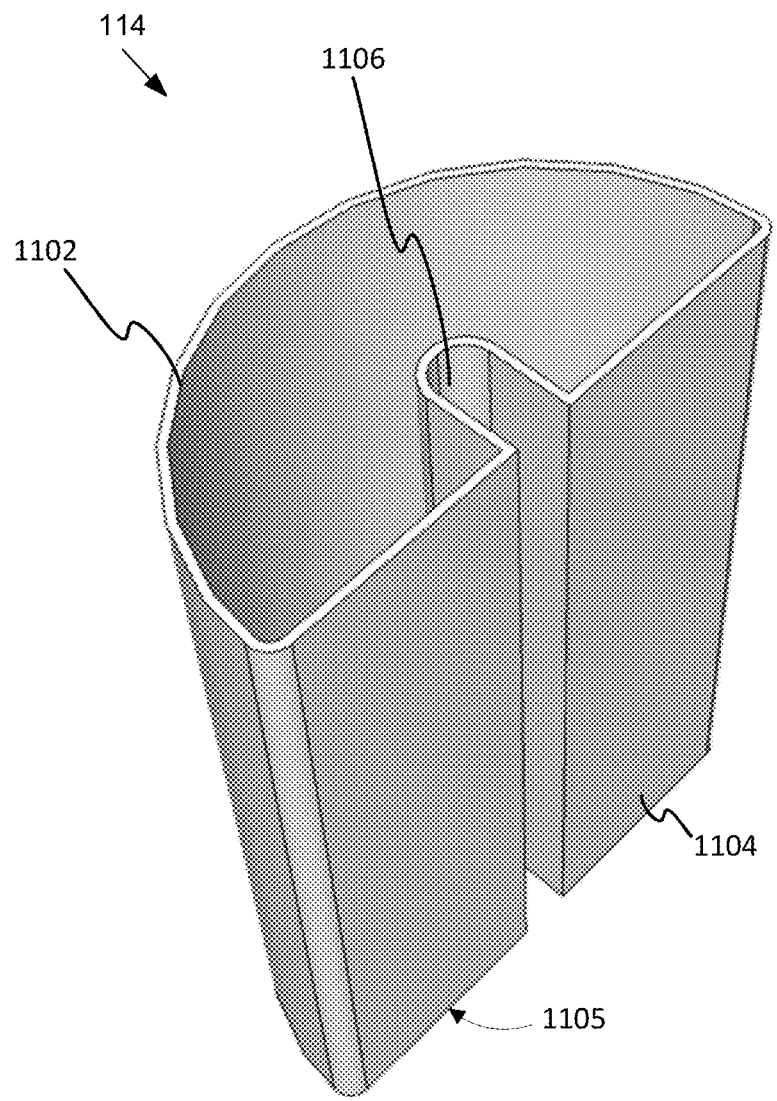
FIG. 11 shows a more detailed view of an exemplary embodiment of a receiving bin of a receptacle of an animal waste bag dispenser and collection station.

FIG. 11 shows a more detailed view of an exemplary embodiment of a receiving bin of a receptacle of an animal waste bag dispenser and collection station. The receiving bin 114 may have a semi-circular shape, including a curved sidewall 1102, a grooved sidewall 1104 and a bottom wall 1105. Alternatively, the receiving bin 116 may be a square, rectangular, or non-symmetrical shape. The groove, or elongated recess, 1106 may extend generally along the length of the grooved sidewall 1104 to receive the upright pole 102, and allow the receiving bin 114 to be securely mounted to the upright pole 102. The groove, or elongated recess, 1106 may be shaped and sized to fit the upright pole 102, and may keep the receiving bin 114 from rotating around the upright pole 102.

The receiving bin 114 may include a plurality of apertures, or holes, in the grooved wall 1104 for mounting the receiving bin 114 to the upright pole 102. The upright pole 102 may also include a plurality of apertures, or holes, that are sized and positioned to align with the holes in the receiving bin 114. Fasteners may be inserted through the holes in the receiving bin 114 and holes in the upright pole 102 to secure the receiving bin 114 to the upright pole 102. The fasteners may be commercially available hooks, screws, bolts, or pins. Alternatively, the mounting member 102 may have a plurality of hooks attached to the outer surface of the receiving bin, and the hooks may be inserted into holes in the upright pole 102 to secure the receiving bin 114 to the upright pole 102. As another alternative, the receiving bin may be mounted to the upright pole 102 using magnets, or any known means for fastening.

As shown in FIGS. 1 to 8, the receptacle 106 may have a generally semi-circular shape with a curved sidewall and a planar sidewall. The lid 116 may be secured to the receiving bin 114, so that the grooved sidewall of the receiving bin 1104 and slotted wall of the lid 902 or 1002 form the planar sidewall of the receptacle, and the curved sidewall of receiving bin 1102 and the curved sidewall of the lid 902 or 1002 form the curved sidewall of the receptacle. The upright pole 102 may be inserted into the slot of the lid 904 or 1004 and the groove of the receiving bin 1106 so that planar sidewall of the receptacle is aligned with the planar sidewall opposite the curved sidewall 136 of the upright pole 102, and the curved sidewall 134 of the upright pole 102 and the two adjoining walls 138, 140 are received in the groove 1106 and the slot 904 or 1004. Alternatively, the receptacle may be mounted to the upright pole 102 so that a portion of the upright pole 102 extends past the planar sidewall of the receptacle.

Figure 12:
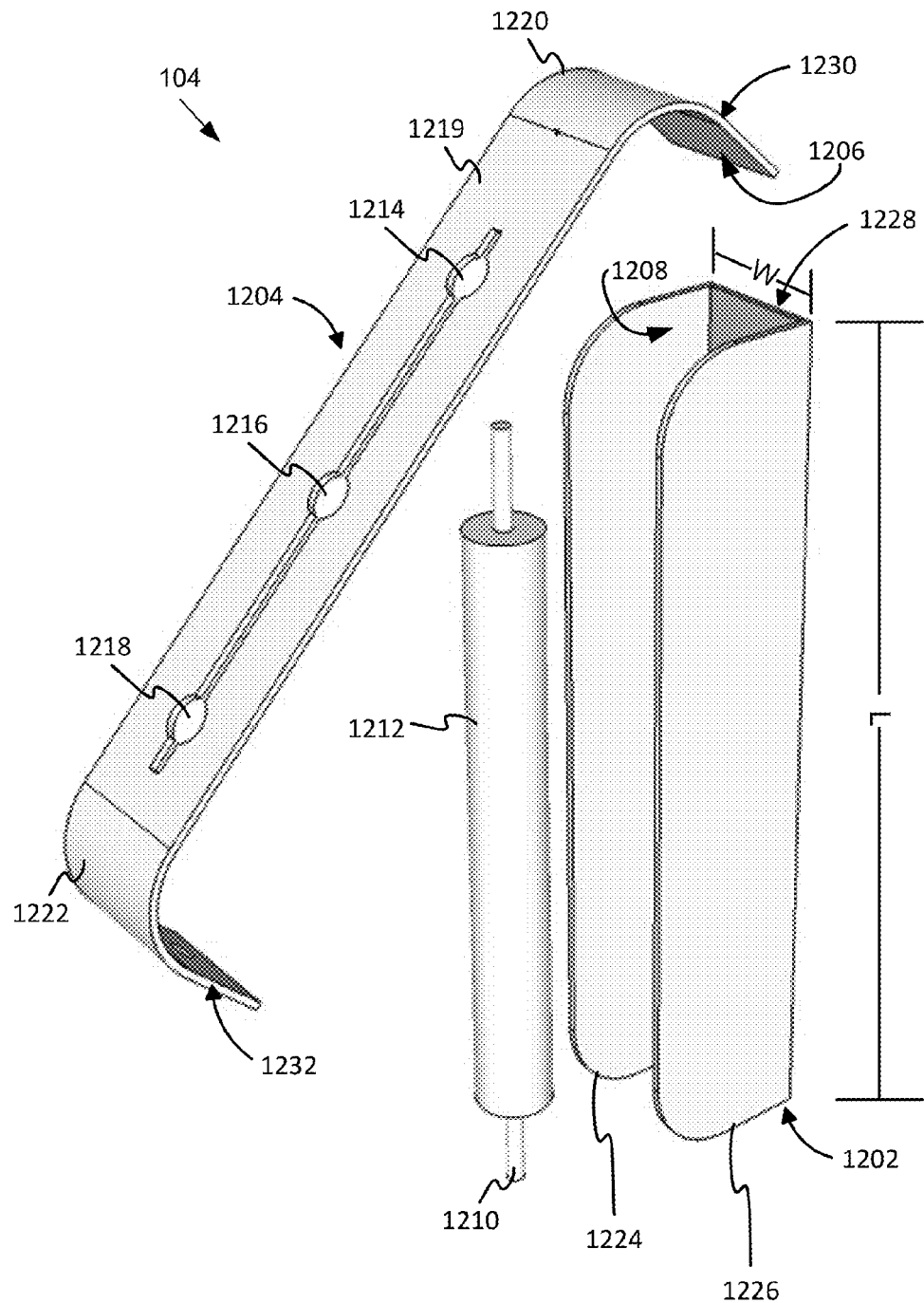
FIG. 12 shows a more detailed view of a dispenser housing for an animal waste bag dispenser and collection station.

FIG. 12 shows a more detailed view of the dispenser housing 104 as shown in the previous figures. The dispenser housing 104 may include a mounting member 1202 and a cover 1204. The cover 1204 may be engagingly mounted on the mounting member 1202 so that the mounting member 1208 define a receiving space that encloses a spindle 1210 and a roll of animal waste bags 1212. For example, the inner surface of the cover 1206 and the inner surface of the mounting member 1208 may define at least a portion of the receiving space. The cover 1204 may also have multiple pick points, or pick openings, 1214, 1216, 1218 for dispensing animal waste bags. The spindle 1210 may be inserted through the roll 1212 to hold the roll 1212 and allow bags to be pulled from the roll 1212 more smoothly. The spindle 1210 may be sized to fit commercially available rolls of bags. In the alternative, bags may be supplied to the dispenser in other configurations than a roll spindle. For example, the bags may be fan-folded (such as in a box of tissues) for placement within the cover 108, or the bags may be spooled on a non-rotating spindle. Other configurations may also be used that are consistent with dispensing configurations in the prior art.

The pick points, or pick openings, 1214, 1216, 1218 may be round openings in the front wall 1219 of the cover 1204 that are sized to allow human fingers to reach through the openings to pinch or grab a bag from the roll 1212. Alternatively, the pick points 1214, 1216, 1218 may be any other shape, such as square, rectangular or a non-symmetrical shape. The pick points, or pick openings, 1214, 1216, 1218 may form a continuous opening along the cover to allow bags to be pulled through the opening. Alternatively, the pick points, or pick openings, 1214, 1216, 1218 may form separate openings that are large enough to allow a bag to be pulled through any of the openings. In other implementations, the cover may include fewer or additional pick points, or pick openings.

The length (L) of the dispenser housing 104 may be long enough to enclose the roll of bags 1212 and the spindle 1210. The width (W) of the dispenser housing 104 may be wide enough fit the roll of bags 1212. To reduce wind resistance and minimize material cost, the length of the dispenser housing may depend on the length of the roll of bags 1212, and the width of the dispenser housing may be the same as, or similar to, the width of the upright pole 102, while being wide enough to hold a full roll of bags 1212. The top corner 1220 and the bottom corner 1222 of the cover may be curved to further reduce wind resistance, and to minimize injuries in case people bump into the dispenser housing 104.

The mounting member 1202 may have a pair of sidewalls 1224, 1226 and a base wall 1228 adjoining the sidewalls for mounting the mounting member 1202 to the upright pole 102. The cover 1204 may be detachably mounted to the sidewalls 1224, 1226 of the mounting member. The sidewalls 1224, 1226 may have rounded corners to fit the cover 1204. The top wall 1230 of the cover 1204 and the bottom wall 1232 of the cover may hold the ends of the spindle 1210, or the spindle 1210 may move freely in the receiving space.

Figure 13:
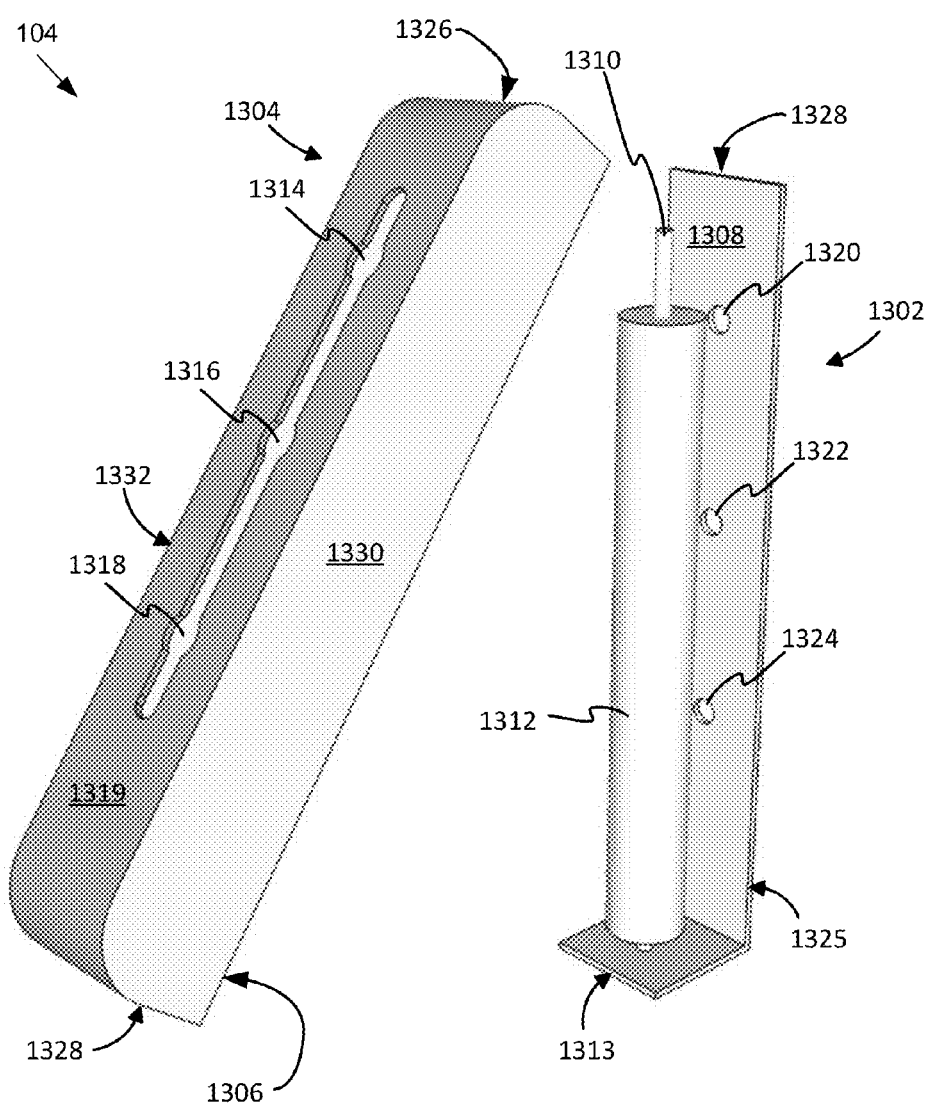
FIG. 13 is another exemplary embodiment of a dispenser housing for an animal waste bag dispenser and collection station.

FIG. 13 is another exemplary embodiment of a dispenser housing for an animal waste bag dispenser and collection station. The dispenser housing 104 may include a mounting member 1302 and a cover 1304. The mounting member 1302 may be an L-shaped bracket. The cover 1304 may be engagingly mounted on the mounting member 1304 so that the cover and the mounting member 1308 to define a receiving space that encloses a spindle 1310 and a roll of animal waste bags 1312. For example, the inner surface of the cover 1306 and the inner surface of the mounting member 1308 may define the receiving space. The bottom wall 1313 of the mounting member may hold an end of the spindle 1310, or the spindle may move freely in the receiving space. The cover 1304 may also have multiple pick points, or pick openings, 1314, 1316, 1318 on the front wall 1319 of the cover 1304 for dispensing animal waste bags.

The mounting member 1302 may include a plurality of apertures, or holes, 1320, 1322, 1324 in the base wall 1325 for mounting the mounting member to the upright pole 102. The upright pole 102 may also include a plurality of apertures, or holes, that are sized and positioned to align with the holes in the mounting member. Fasteners may be inserted through the holes in the mounting member 102 and holes in the upright pole to secure the mounting member 1302 to the upright pole 102. The fasteners may be commercially available hooks, screws, bolts, or pins. Alternatively, the mounting member 102 may have a plurality of hooks attached to the outer surface of the mounting member, and the hooks may be inserted into holes in the upright pole 102 to secure the mounting member 1302 to the upright pole 102. As another alternative, the mounting member 1302 may be mounted to the upright pole 102 using magnets, glue, welding, or any known means for fastening. Also, a sliding dovetail or other pre-formed mating configuration may be used.

The cover 1304 is movable between an open position and a closed position. In the open position, the spindle 1310 and roll 1312 may be installed in or removed from the dispenser housing 104 to refill the bags. In the closed position, the cover 1304 may protect the bags from wind, snow, rain, and the other sources of destruction. The dispenser housing 1304 may further include a seal, such as rubber or foam, along the edge of the cover 1304 and/or the mounting member 1302. The top wall 1326 of the cover may be connected to the top edge of the mounting member 1328. Alternatively, the cover 1304 may be mounted by a snap fit or a hinge onto the mounting member 1302. The bottom wall 1328 of the cover may overlap the bottom wall 1313 of the mounting member. The bottom wall 1328 may include a keyhole for securing the cover 1304 in the close position. The sidewalls 1330, 1332, the top wall 1326, and the bottom wall 1328 of the cover may enclose the base wall 1308 and the bottom wall 1313 of the mounting member to prevent water and foreign debris from entering the dispenser housing.

Figure 14:
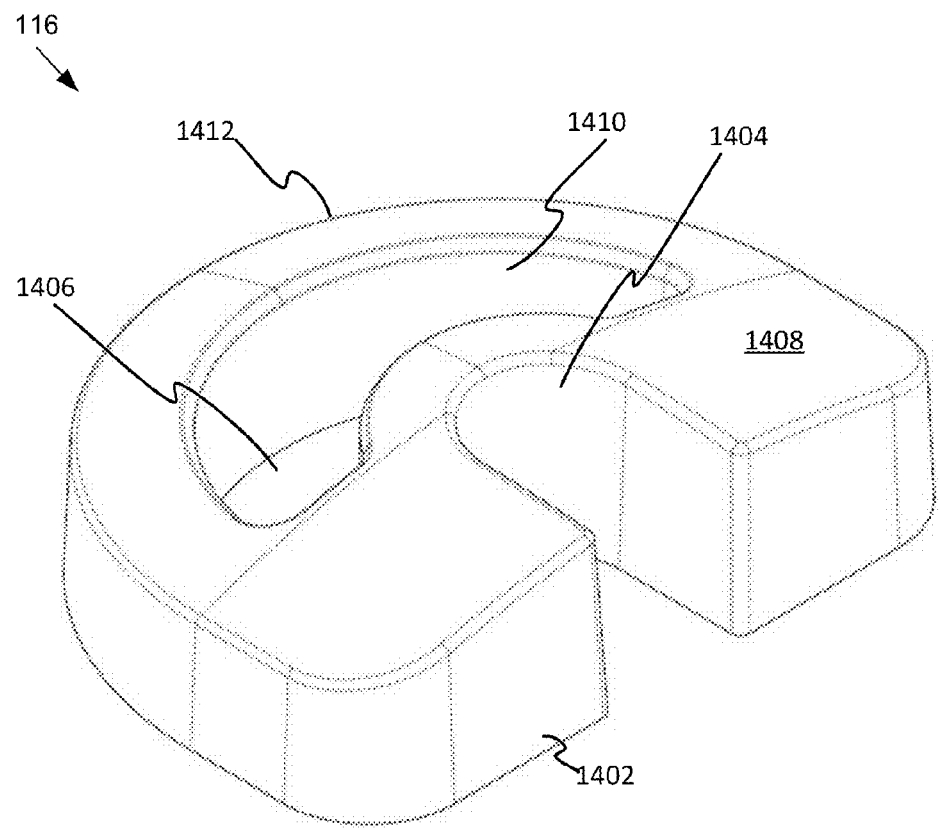
FIG. 14 shows one view of another embodiment of a lid of a receiving bin of an animal waste bag dispenser and collection station.
Figure 15:
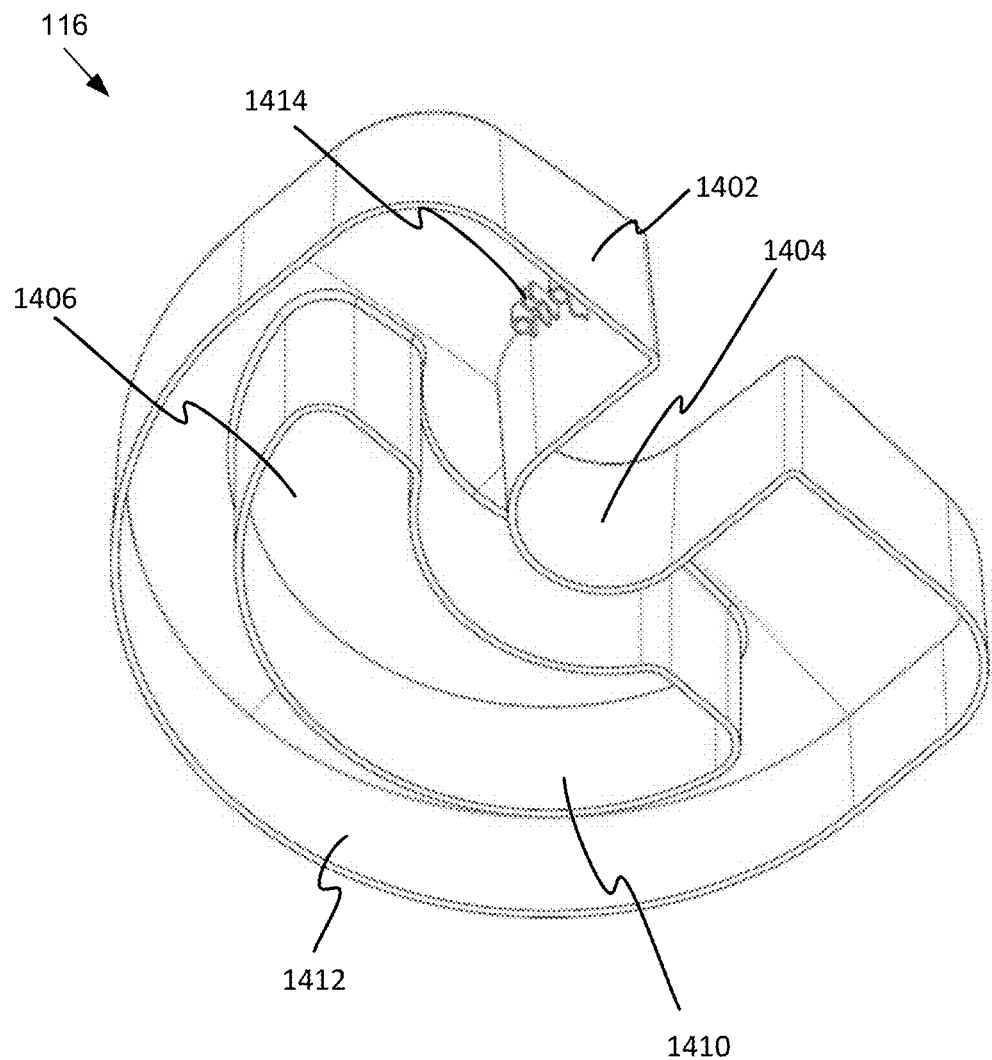
FIG. 15 shows another view of another embodiment of a lid of a receiving bin of an animal waste bag dispenser and collection station.

FIGS. 14 and 15 show another exemplary embodiment of a lid of a receiving bin of an animal waste bag dispenser and collection station. As shown in the lid 116 may have a slotted wall 1402 with a slot 1404 that is sized to receive the upright pole 102. The lid 116 has an opening 1406 in a top wall 1408, as shown in FIG. 14. The top wall 1408 may be flat or curved. The opening 1406 may be sized for disposing waste, such as bags containing animal waste into the receptacle 106. A width of the opening 1406 may span 50% or more of the width of the lid 116. This may prevent disposed waste from collecting, or piling up, in a concentrated area of the receiving bin 114. In other words, a wide opening 1406 in the lid 116 may allow disposed waste to be distributed more evenly throughout the receiving bin 114, which may allow the receiving bin 114 to collect more waste and require less frequent emptying of the receiving bin 114. The opening 1406 may have an inner wall 1410 that curves and extends towards the receiving bin 114, so as to prevent edges from tearing the bags of waste and allows the bags to slide into the receiving bin 114.

A curved sidewall 1412 of the lid and the planar slotted wall 1402 may be configured and/or shaped to fit complimentarily with the cross-section of the receiving bin 114. For example, the curved sidewall 1412 and the planar slotted wall 1402 may be sized and configured with protrusions 1414 to create a snap fit with the receiving bin 116, as shown in FIG. 15. The lid 116 may be formed as a continuous piece of plastic, or it may be molded, formed, cast, and/or assembled from aluminum, sheetmetal, iron, steel, or any other suitable metal or plastic material. Suitable materials may include any plastic or metal that is durable and/or weather resistant.

Figure 16:
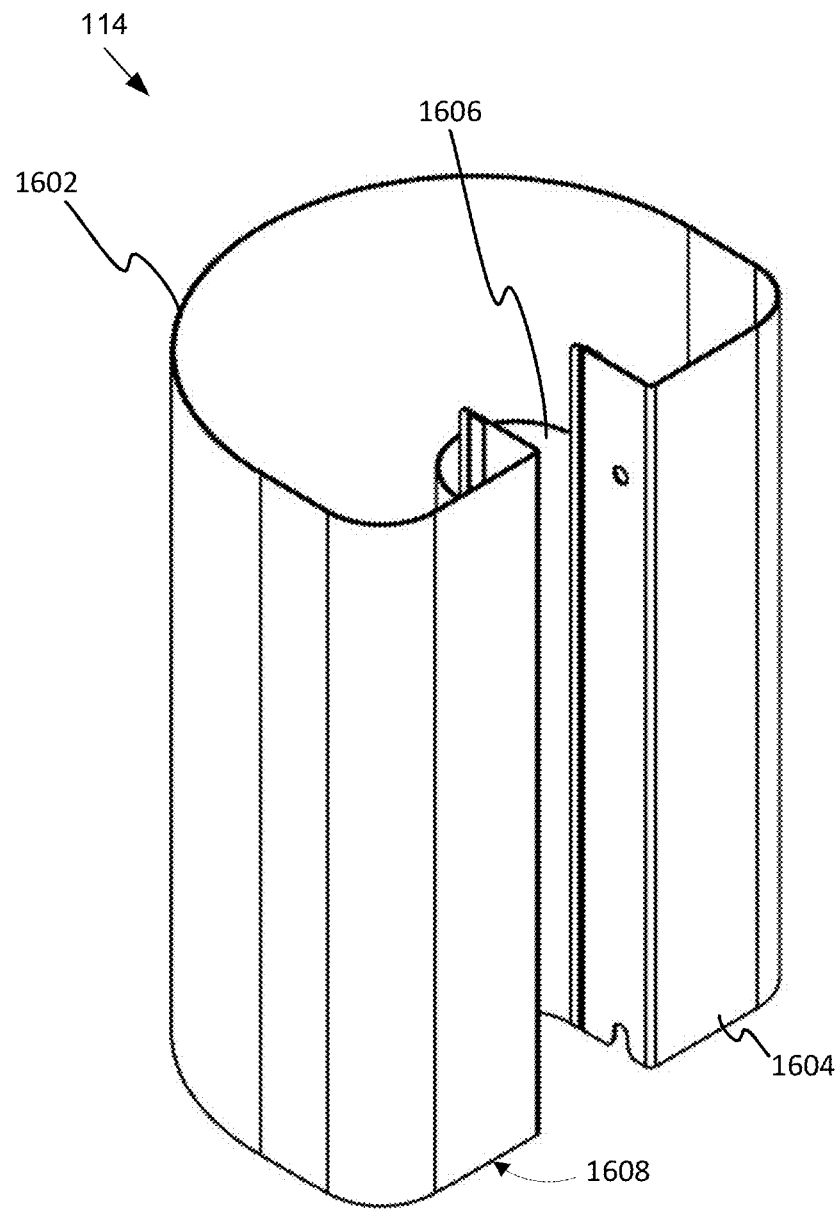
FIG. 16 shows one view of another exemplary embodiment of a receiving bin of a receptacle of an animal waste bag dispenser and collection station.
Figure 17:
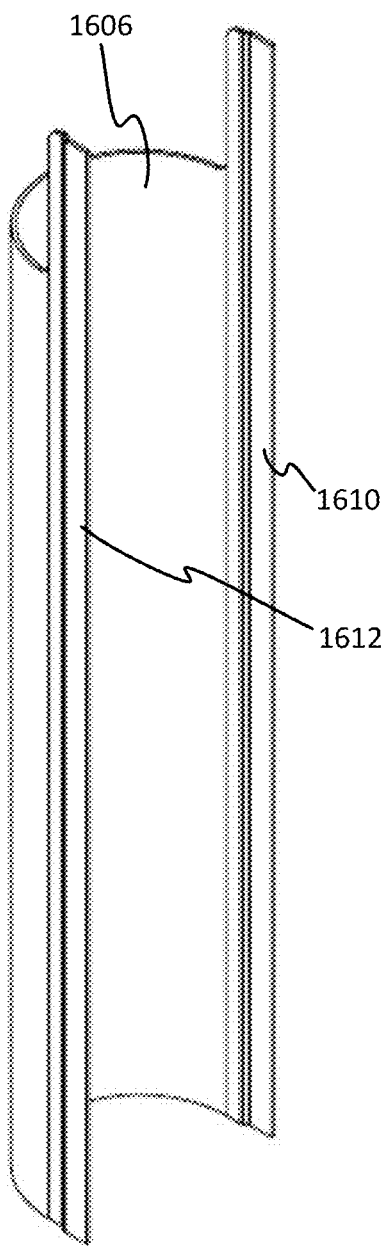
FIG. 17 shows a detailed view of a curved panel of an exemplary embodiment of a receiving bin of a receptacle of an animal waste bag dispenser and collection station.
Figure 18:
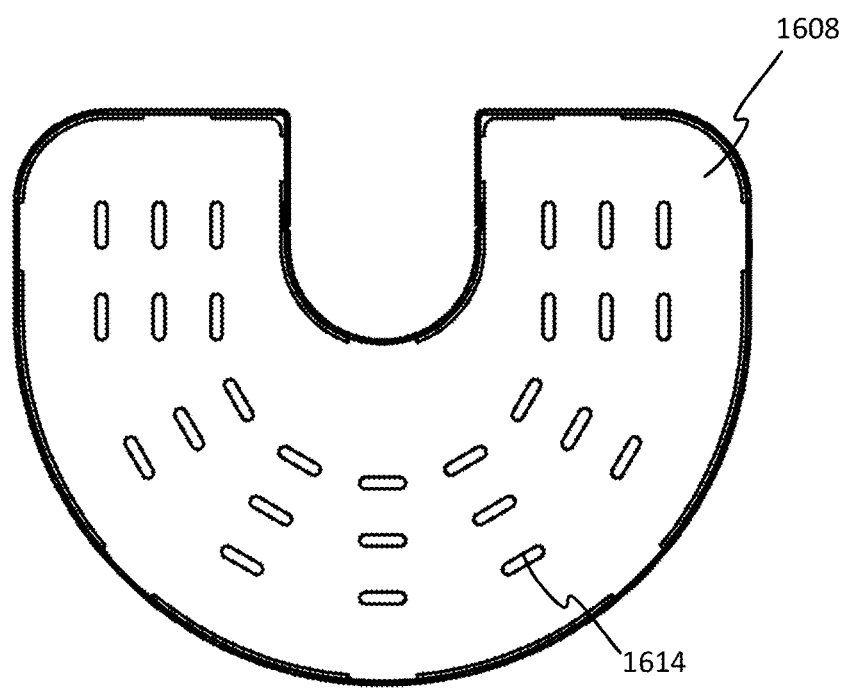
FIG. 18 shows a bottom wall of an exemplary embodiment of a receiving bin of a receptacle of an animal waste bag dispenser and collection station.

FIGS. 16, 17, and 18 show another exemplary embodiment of a receiving bin of a receptacle of an animal waste bag dispenser and collection station. The receiving bin 114 may have a curved sidewall 1602, a planar sidewall 1604, a curved panel 1606, and a bottom wall 1608. The curved panel 1606 may have side portions 1610, 1612, as shown in FIG. 17, such that the curved panel 1606 may be attached to the planar sidewall 1604 by welding, by fasteners, or by any other known suitable method. The curved panel 1606 may be attached to the planar sidewall 1604 to form a groove, channel, or recess, that is sized and shaped to receive the upright pole 102, and allow the receiving bin 114 to be securely mounted to the upright pole 104. For example, the groove, channel, or recess may be shaped and sized to fit around the upright pole 102, and may keep the receiving bin 114 from rotating around the upright pole 102.

As shown in FIG. 18, the bottom wall 1608 may include openings 1614 to provide ventilation and to allow moisture, condensation, or other liquid to drain from the receiving bin 114. The bottom wall 1608 may be attached to the curved sidewall 1602, the planar sidewall 1604, and the curved panel 1606 by welding, by fasteners, or by any other known suitable method. The curved sidewall 1602, planar sidewall 1604, curved panel 1606, and bottom wall 1608 may separate components assembled together, and may be made from the same or different materials, such as aluminum, steel, sheetmetal, plastic, or other suitable materials previously discussed. Alternatively, the curved sidewall 1602, planar sidewall 1604, curved panel 1606, and bottom wall 1608 may be formed from a continuous piece of plastic or metal.

Figure 19:
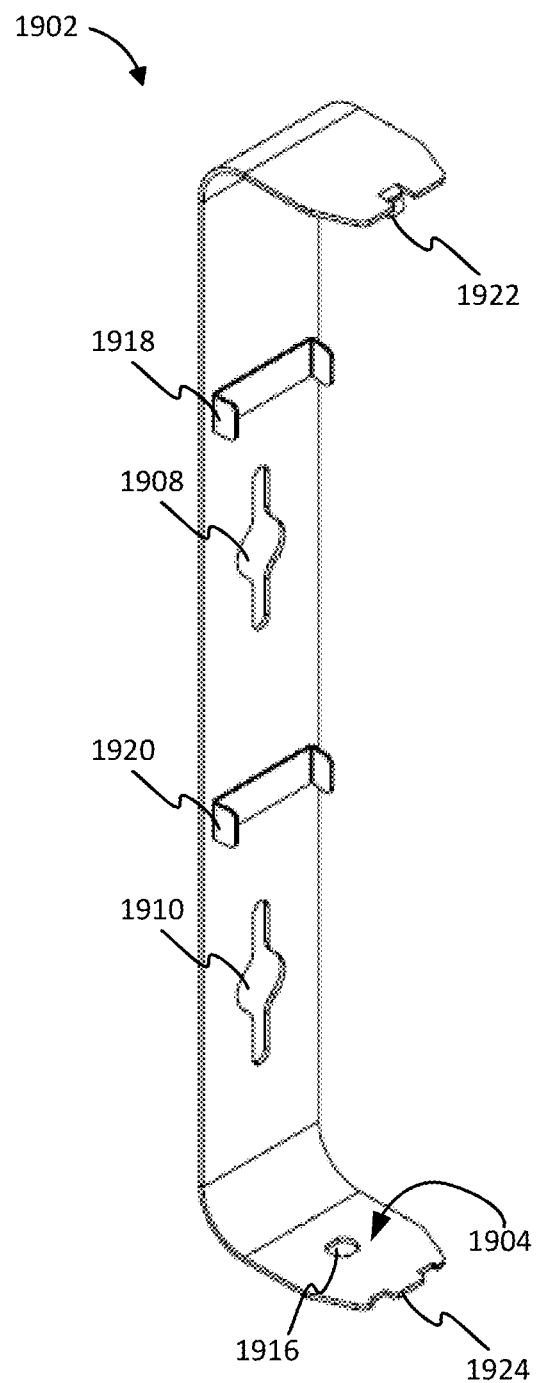
FIG. 19 shows another exemplary embodiment of a cover for a dispenser housing.
Figure 20:
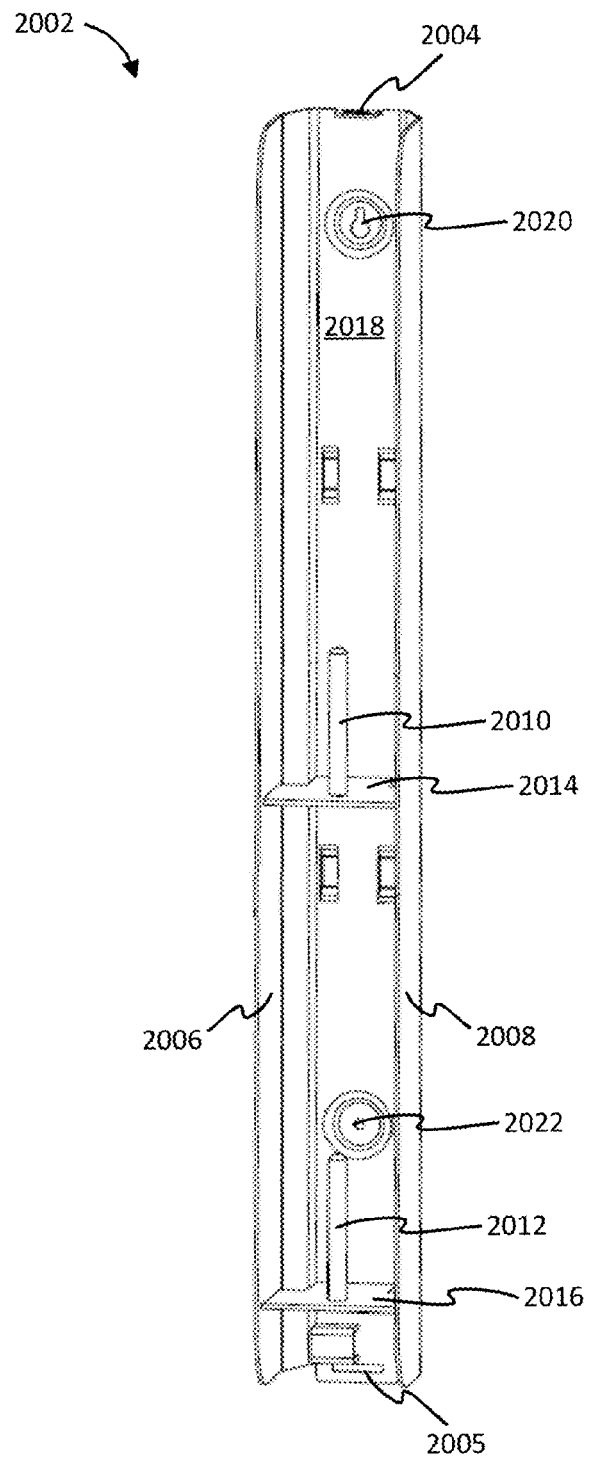
FIG. 20 shows one view of another exemplary embodiment of a mounting member for a dispenser housing.

FIG. 19 shows another exemplary embodiment of a cover for a dispenser housing. The cover 1902 may have an inner surface 1904 and a front wall 1906 having multiple pick points, or openings, 1908, 1910 that dispense animal waste bags. The cover 1902 also has a top wall 1912 and a bottom wall 1914. A keyhole 1916 in the bottom wall 1914 may provide access to a lock that keeps the cover 1902 in a closed position. Mounting brackets 1918, 1920 may be used to attach the cover 1902 to a mounting member 2002 (FIG. 20). The cover 1902 may also have attachment tabs 1922, 1924 that allow the cover 1902 to be snapped into place with corresponding receiving recesses 2004, 2005 (FIG. 20) on the mounting member 2002.

Figure 21:
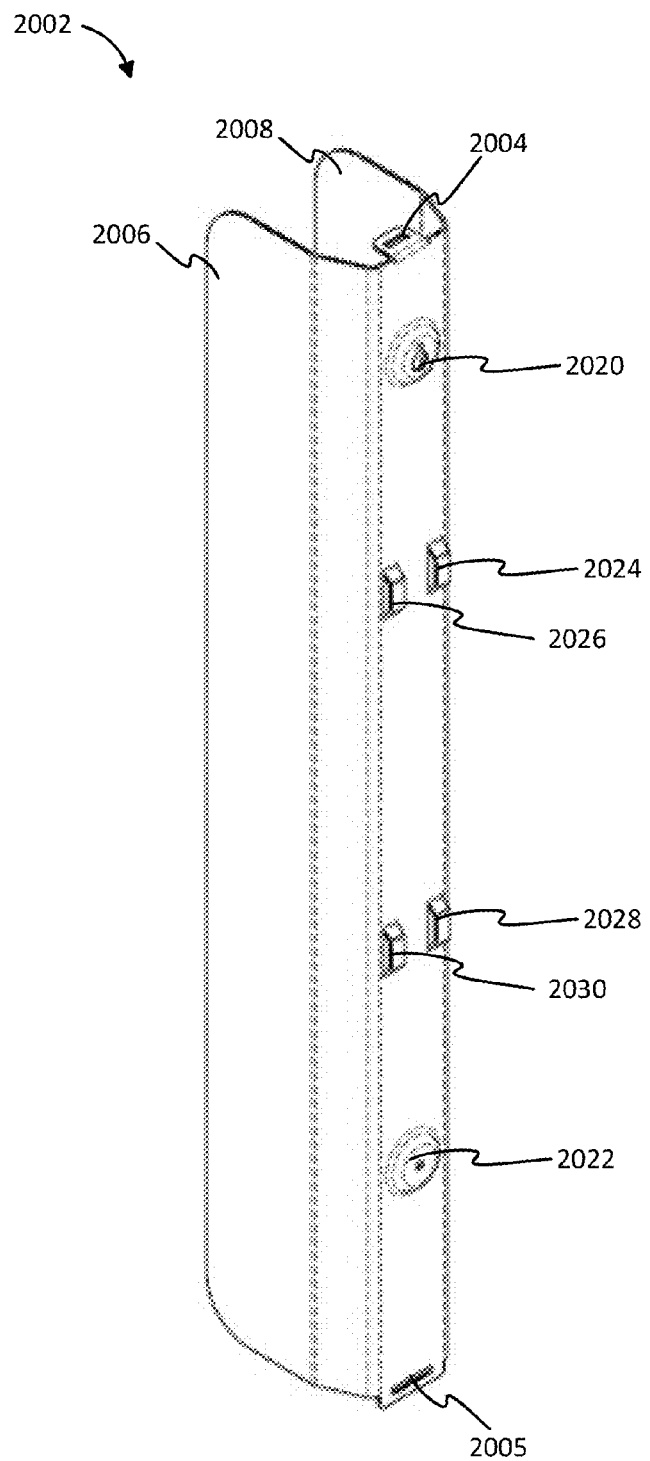
FIG. 21 shows another view of another exemplary embodiment of a mounting member for a dispenser housing.

FIGS. 20 and 21 show another exemplary embodiment of a mounting member for a dispenser housing. The mounting member 2002 may be sized and shaped to be mated with the cover 1902, or with other embodiments of the cover. The mounting brackets 1918, 1920 may be sized to form a friction fit with sidewalls 2006, 2008 of the mounting member 2002. The mounting member 2002 may have spindles 2010, 2012 that may hold one or more rolls of bags. The size and number of spindles 2010, 2012 in the mounting member 2002 may vary depending on the size of rolls of bags. The spindles 2010, 2012 may be fixed to division or support tabs 2014, 2016 of the mounting member 2002. The division or support tabs 2014, 2016 of the mounting member 2002 may form compartments for holding, or receiving, a roll of bags in each compartment. The support tab 2016 may form the bottom wall of the mounting member 2002. The cover 1902 may be attached to the mounting member 2002 by aligning the attachment tabs 1922, 1924 with the corresponding receiving recesses 2004, 2005 on the mounting member 2002. The attachment tabs 1922, 1924 may form a snap fit with the receiving recesses 2004, 2005. Alternatively, the cover 1902 may be attached to the mounting member 2002 by a hinge, by fasteners, or by other suitable means.

When the cover 1902 is assembled with the mounting member 2002, the inner surface 1904 of the cover 1902 and the inner surface 2018 of the mounting member define one or more receiving spaces that each encloses one or more spindles and rolls of bags. A plurality of apertures, or holes, 2020, 2022 may be included to mount the mounting member 2002 to an upright pole 102, or other surface. Alternatively, or additionally, the mounting member 2002 may include protrusions 2024, 2026, 2028, 2030 to mount the mounting member 2002 to an upright pole 102, or other surface.

Figure 22:
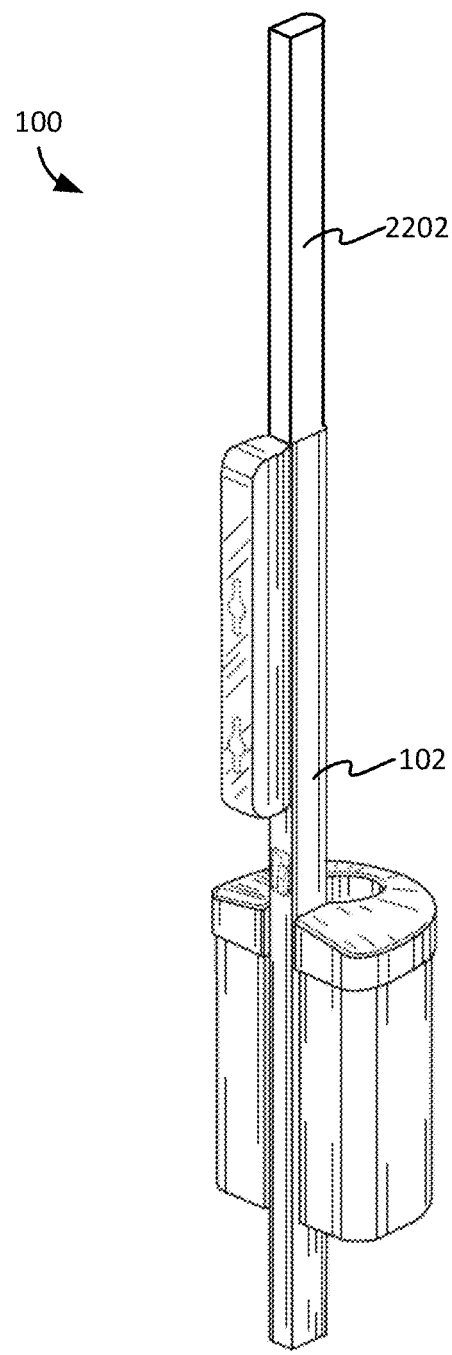
FIG. 22 is another embodiment of an animal waste bag dispenser and collection station.

FIG. 22 is another embodiment of an animal waste bag dispenser and collection station. The animal waste bag dispenser and collection station 100 may further include a light 2202. The light 2202 may be a solar powered light, which collects solar energy from the sun during daytime to power the light. Alternatively, the light 2202 may be an LED (light emitting diode) or other commercially available light. The light 2202 may have the same or a similar cross section as the upright pole 102. The upright pole 102 may be mounted by staking into the ground. Alternatively, the upright pole 102 may have a hollow center that allows it to be mounted on a pole or stake that is already mounted in the ground.

Other uses of the bag dispenser and collection station described herein are contemplated. For example, the receptacle may hold other types of waste, such as regular litter, bathroom waste, recyclables, and the like. The bag dispenser may dispense any size and type of bag.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The invention claimed is:

1. An animal waste bag dispenser and collection apparatus, comprising:
   an upright pole;
   a dispenser housing detachably mounted to the upright pole by a mounting member, said dispenser housing comprising a spindle configured to receive a roll of bags and a cover having a front wall defining at least one pick opening configured to allow the dispensing of the bags, wherein the cover is engagingly mounted on the mounting member to define a receiving space that encloses the spindle and the roll of bags therein;
   a receptacle detachably mounted to the upright pole, said receptacle comprising a receiving bin having a grooved sidewall, said groove being configured to receive and mount at least a portion of the upright pole therein; and
   a lid removably covering the receiving bin, said lid having a slotted wall configured to receive at least a portion of the upright pole therein and an opening configured to receive bags containing animal waste.

2. The apparatus of claim 1, wherein the receptacle is mounted to a base portion of the upright pole and the dispenser housing is mounted to an upper portion of the upright pole.

3. The apparatus of claim 1, wherein the dispenser housing is mounted to a base portion of the upright pole and the dispenser housing is mounted to an upper portion of the upright pole.

4. The apparatus of claim 1 further comprising a plurality of fasteners configured to mount the dispenser housing and the receptacle to the upright pole.

5. The apparatus of claim 1, wherein:
   the upright pole further comprises a curved sidewall, a planar sidewall opposite the curved sidewall, and two connecting walls adjoining the curved sidewall to the planar sidewall opposite the curved sidewall, the walls defining a substantially oblong and uniform cross section.

6. The apparatus of claim 1, wherein the upright pole comprises a plurality of apertures for detachably mounting the dispenser housing and the receptacle to the upright pole, and the dispenser housing and receptacle include hooks to be inserted into the plurality of apertures in the upright pole.

7. The apparatus of claim 1, wherein the at least one pick opening further comprises a plurality of generally round openings sized to allow human fingers to grab and pull a bag through said openings.

8. The apparatus of claim 7, wherein the upright pole further comprises extruded aluminum.

9. The apparatus of claim 1, wherein the at least one pick opening further comprises an elongated slot in the cover.

10. The apparatus of claim 1, wherein:
    the receptacle comprises a curved sidewall and a planar sidewall,
    the grooved sidewall of the receiving bin and the slotted wall of the lid form the planar sidewall of the receptacle, and
    a curved sidewall of the receiving bin and a curved sidewall of the lid form the curved sidewall of the receptacle.

11. The apparatus of claim 1, wherein:
    a top wall of the cover is coupled by a hinge to a top edge of the mounting member,
    the cover is movable between an open position and a closed position, and
    a bottom wall of the cover includes a keyhole.

12. The apparatus of claim 1, wherein the slot of the lid forms a continuous notch with the opening of the lid.

13. The apparatus of claim 1, wherein the lid is mounted on the receiving bin by snap fit.

14. A waste bag dispenser and collection apparatus, comprising:
    a mounting surface;
    a dispenser housing detachably mounted to the mounting surface by a mounting member, said dispenser housing comprising a first spindle configured to receive thereon a first roll of bags, a second spindle configured to receive thereon a second roll of bags, and a cover comprising a front wall defining at least one pick opening configured to dispense bags, wherein the cover is engagingly mounted on the mounting member to define a receiving space enclosing the first and second rolls of bags therein;
    a receptacle detachably mounted to the mounting surface, said receptacle comprising a receiving bin mounted to the mounting surface; and
    a lid removably covering the receiving bin, said lid comprising an opening configured to receive bags containing waste.

15. The apparatus of claim 14, wherein the mounting surface is a wall or a fence.

16. The apparatus of claim 14, wherein:
    the mounting surface is a planar sidewall of an upright pole, said upright pole comprising a curved sidewall opposite the planar sidewall, and two connecting walls adjoining the curved sidewall to the planar sidewall opposite the curved sidewall, the walls defining a substantially oblong and uniform cross section; and
    the receiving bin further comprises a channeled sidewall that is sized and configured to receive, within the channel, the curved sidewall of the upright pole and the two connecting walls.

17. The apparatus of claim 14, wherein:
    the dispenser housing further comprises a first division tab that divides the receiving space into a first compartment and a second compartment;

the first compartment enclosing therein the first spindle and the first roll of bags; and the second compartment enclosing therein the second spindle and the second roll of bags.

18. The apparatus of claim 17, wherein the at least one pick opening comprises a plurality of generally round openings sized to allow human fingers to grab and pull a bag through said openings.

19. The apparatus of claim 18 wherein the plurality of generally round openings comprises a first generally round opening aligned to provide access to the first roll of bags in the upper compartment and a second generally round opening aligned to provide access to the second roll of bags in the lower compartment.

20. The apparatus of claim 17, wherein the first spindle is fixedly mounted to the first division tab and the second spindle is fixedly mounted to a bottom wall of the mounting member.

* * * * *